July 20, 1965   KOHEI YAMAMURA   3,195,147
METHOD OF TAILORING SHIRTS FROM TUBULAR KNITTED FABRICS
Filed June 13, 1961   5 Sheets-Sheet 1

INVENTOR
KOHEI YAMAMURA
ATTORNEYS

July 20, 1965   KOHEI YAMAMURA   3,195,147
METHOD OF TAILORING SHIRTS FROM TUBULAR KNITTED FABRICS
Filed June 13, 1961   5 Sheets-Sheet 2

INVENTOR
KOHEI YAMAMURA
ATTORNEYS

INVENTOR
KOHEI YAMAMURA
ATTORNEYS

July 20, 1965 KOHEI YAMAMURA 3,195,147
METHOD OF TAILORING SHIRTS FROM TUBULAR KNITTED FABRICS
Filed June 13, 1961. 5 Sheets-Sheet 5

INVENTOR
KOHEI YAMAMURA
ATTORNEYS

United States Patent Office 3,195,147
Patented July 20, 1965

3,195,147
METHOD OF TAILORING SHIRTS FROM TUBULAR KNITTED FABRICS
Kohei Yamamura, 12 2-chome, Kamezawa-cho, Sumida-ku, Tokyo, Japan
Filed June 13, 1961, Ser. No. 116,717
Claims priority, application Japan, Dec. 30, 1960, 35/51,721
2 Claims. (Cl. 2—243)

The present invention relates to a method of tailoring shirts from tubular knitted fabrics.

Generally, the method comprises the steps of knitting circularly a fabric tube of the desired length, flattening the tube to provide two layers, severing both layers of the tube along a symmetrically wave-shaped line extending transversely of the tube at approximately the center thereof for providing a body section and a sleeve section, cutting both layers of the sleeve section along two diagonal lines for providing free edges therefor, severing the sleeve section along the fold lines for providing two sleeve members, attaching each sleeve member along its free edges for forming a sleeve, folding the body section along its longitudinal center line for providing front and rear portions of the shirt and securing the sleeves to the arm holes provided by the symmetrically wave-shaped line when the body section is folded along the longitudinal center line.

Further objects and advantages of the invention will become more readily apparent to one skilled in the art from the following detailed description and drawings.

The accompanying drawings show an example of the tailoring method based upon this invention, in which.

Figure 5:
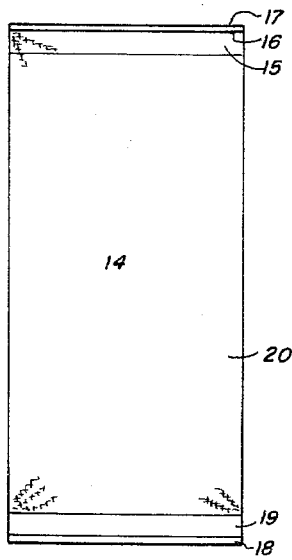
FIG. 5 is a front view of the circular-knitted fabric necessary for the cutting work.
Figure 13:
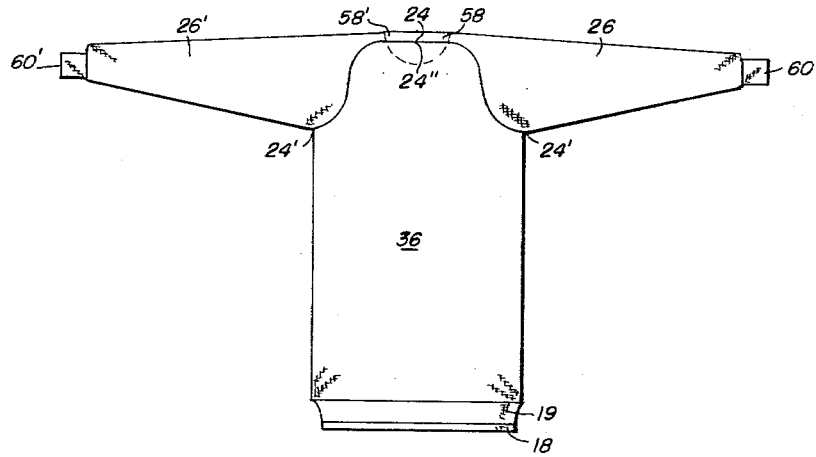
Figure 7:
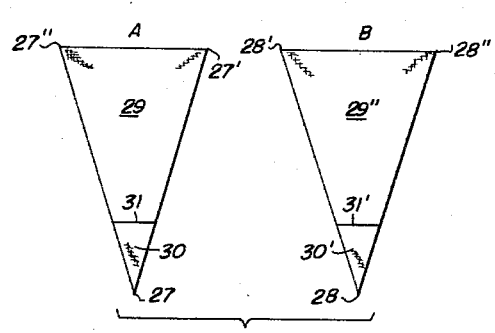
Figure 8:
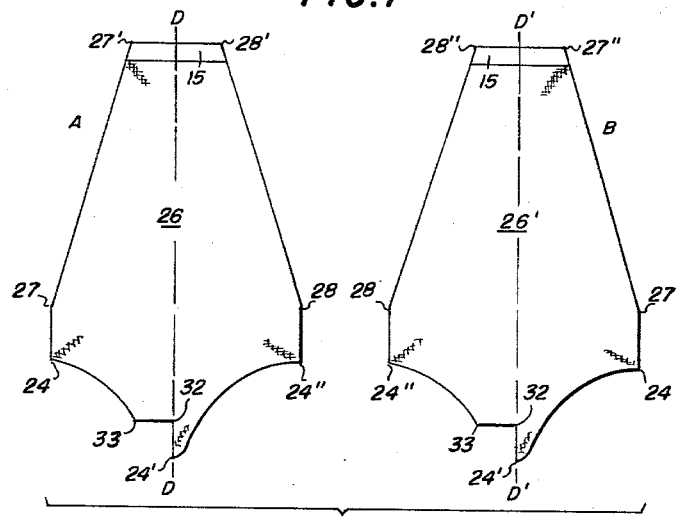
Figure 9:
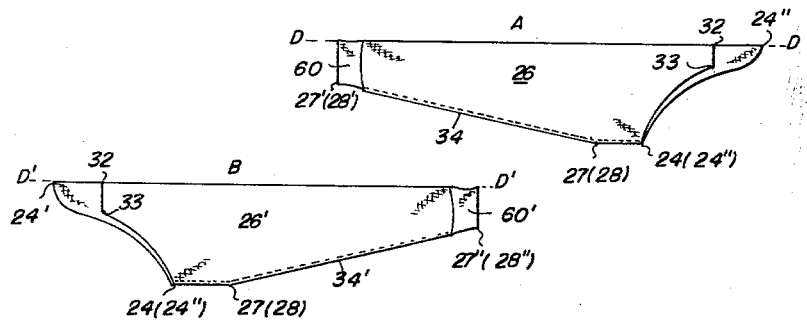
Figure 10:
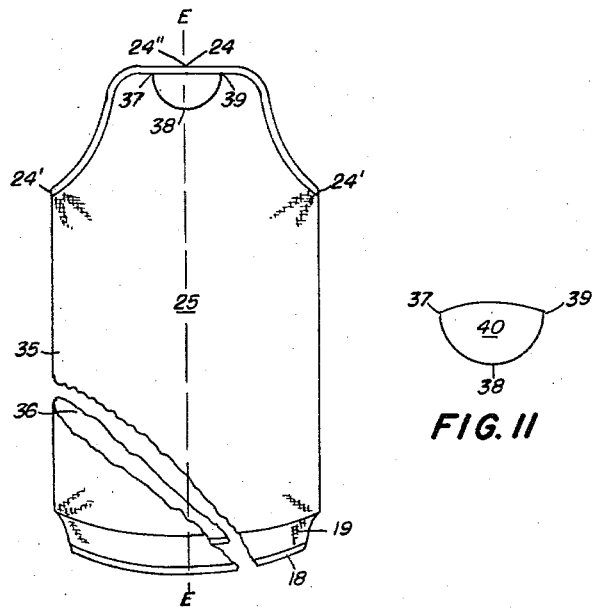
Figure 11:
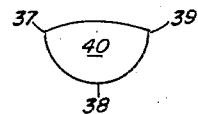
Figure 12:
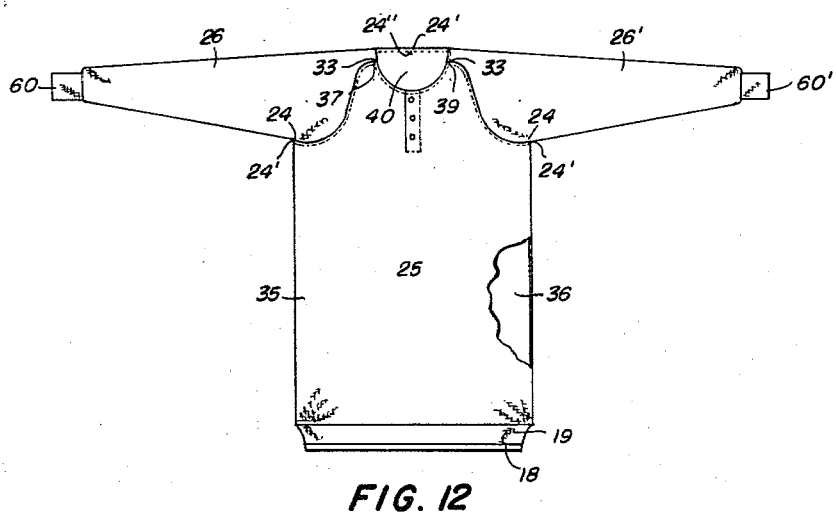

In FIG. 7, A and B are plan views of the front panels of the drawers;

In FIG. 8, A and B are enlarged plan views of both arm cylinders;

In FIG. 9, A and B are angular diagrammatic views of the arm sleeves made with the fabrics as shown in FIG. 5;

FIG. 10 is a front view of the body portion of the shirt partly cut away;

FIG. 11 is a plan view of a cut neck portion;

FIG. 12 is a front view of the finished shirt with a side front portion cut away; and FIG. 13 is a back view of the shirt.

In order to describe this invention more concretely, the explanation shall be divided into the following items:

1. *Preparation for the circular knitting machine*

Figure 1:
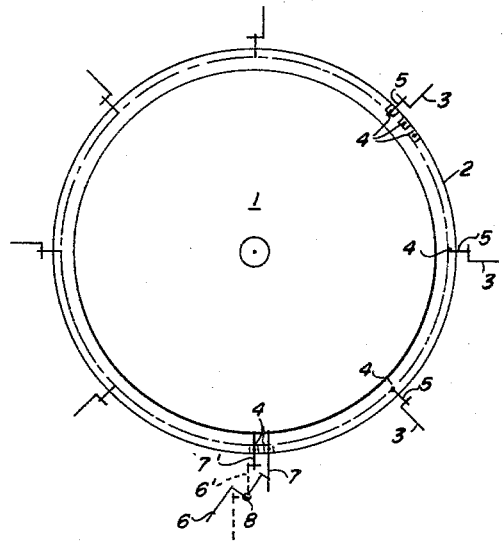
FIG. 1 is a diagrammatic view of a circular-knitting machine for a tubular fabric employing this invention.
Figure 2:
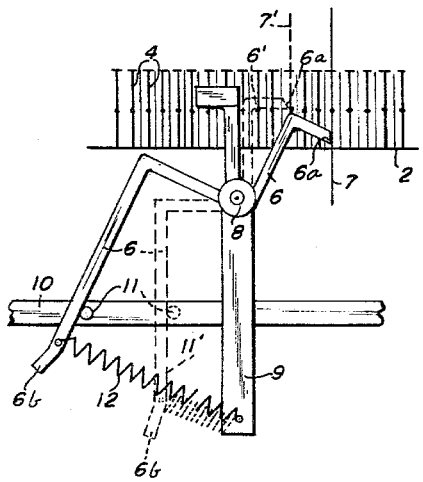
FIG. 2 is a plan view of a yarn-leading section.

As shown in FIG. 1, certain levers 3 on knitting base 2 of circular knitting machine 1 feed yarn 5 to knitting needles 4. Of the above levers, levers 6 located at one or two points are moved from or brought into contact with the needles 4 so that a lay-in yarn 7 fed by the lever 6 is supplied only when the tubular fabric is knitted in sequence into the required length by the action of the needles 4 with the rotation of the knitting base (FIG. 2). The lever 6, which is substantially Z-shaped, is loosely mounted on shaft 8 of machine frame 9, and serves for leading the lay-in yarn 7 to the requisite needle 4. In most cases, however, end 6a of the lever 6 which introduces the yarn is kept off the surface of the knitting base 2 so that the lay-in yarn 7 is not supplied to the knitting needle. When the tubular fabric has been knitted to the required length and subsequently the lay-in yarn is supplied, the end 6a of the lever 6 moves close to the needle 4 to bring the yarn 7 into position 7', and inserts the yarn into the fabric. This action is achieved by means of a cam separately fitted or a lug mounted on a rotatable chain. A projection 11 which supports the other end 6b of the lever 6 is fixed to a frame 10, which is moved by the cam or lug. When the knitted fabric reaches the required length, the frame 10 becomes operative and the projection 11 releases the support of the lever 6 and the lever moves to the required position 11'. As a consequence, the lever 6, which had been tensioned by a spring 12 located between the end 6b of the lever 6 and a frame member 9, moves into contact with the projection 11, and then the end 6a moves close to the knitting base 2 to hang the yarn 7 on the knitting needle, and insert the yarn into the knitted fabric. When the yarn is so inserted that the knitting base may turn one revolution, and the lay-in yarn 7 may also make one revolution around the trunk of the tubular fabric, the frame 10 becomes effective to keep the lever 6 off the knitting base and stop the insertion of the yarn 7. However, the knitting of other yarns still continues and, therefore, the tubular fabric is knitted into the required length, not being kept off the insertion section. When the required length is reached, the lay-in yarn is further inserted. This process is thus repeated.

2. *Process of making the consecutive tubular fabric into the unit tubular fabric*

Figure 3:
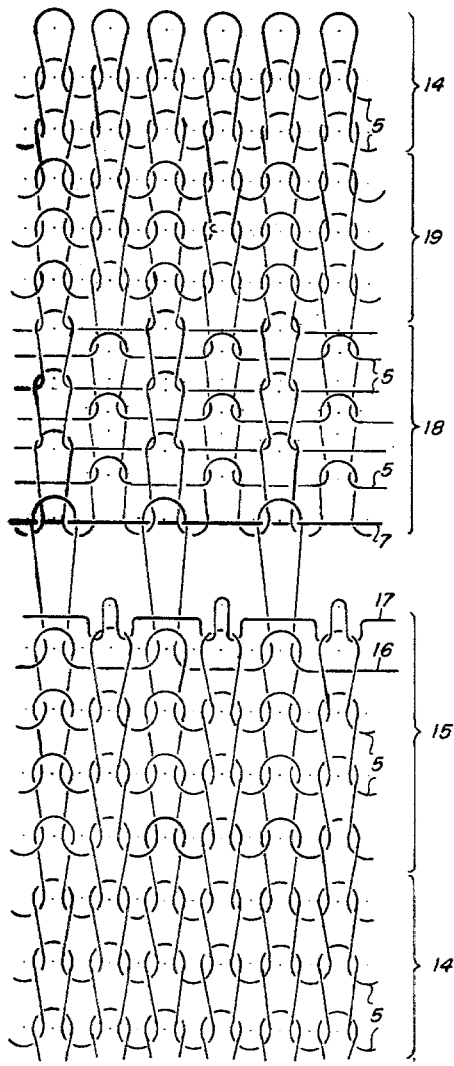
FIG. 3 is a diagrammatic view on an enlarged scale of the structure of tubular fabric.
Figure 4:
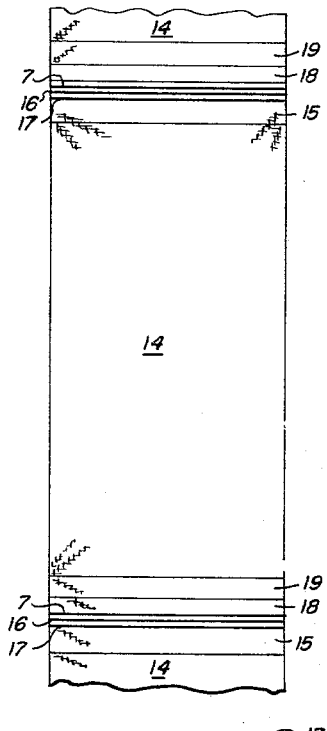
FIG. 4 is a diagrammatic view of a series of tubular fabric.

FIGS. 3, 4 and 5 show a tubular fabric which was knitted on a circular knitting machine. The knitting yarn 5 is knitted into the main section of the knitted fabric. A subsequent portion of the knitting is shown in FIG. 3. As for the main section, an interlink yarn 16 and a fastening yarn 17 are knitted into the end section after plain-knitted section 14 and rib-knitted section 15 have been knitted. The rib-knitted section is made into the end portion of the arm for the shirt. Thus they are connected with the next tubular knitted section by means of the interlink yarn 16. When this interlink yarn 16 links the subsequent fabric, the yarn 7 is inserted, and consequently the mesh of the interlink yarn 16 is caught in the lay-in yarn 7 and the mesh of the subsequent fabric to form a series of the fabric. The lay-in yarn 7 is then only passed through, with no mesh being made. As for the following fabric, it begins with the interlock rib 18, changes into rib knitting 19 at a suitable position and further into plain knitting 14. When this process is continuously repeated, a consecutive tubular fabric shown in FIG. 4 is knitted.

When the lay-in yarn 7 is withdrawn from this tubular fabric, the interlink yarn 16 of one fabric comes off the mesh of another fabric, and circular-knitted portion 20 of the required length shown in FIG. 5 can be obtained. This circular-knitted fabric 20 is a basic fabric which is made into the shirt. In case the shirts are continuously manufactured, the length of the unit fabric is alternatively changed properly. Meanwhile, when the fabric is knitted separately in the length of a shirt, the fabric is knitted in a definite length suitable for the shirt. Then the fabrics, long and short, are combined in the tailoring and manufacturing works. In any event, a combination of the circular-knitted fabrics for the shirt is made in the following order.

3. *Tailoring works*

Figure 6:
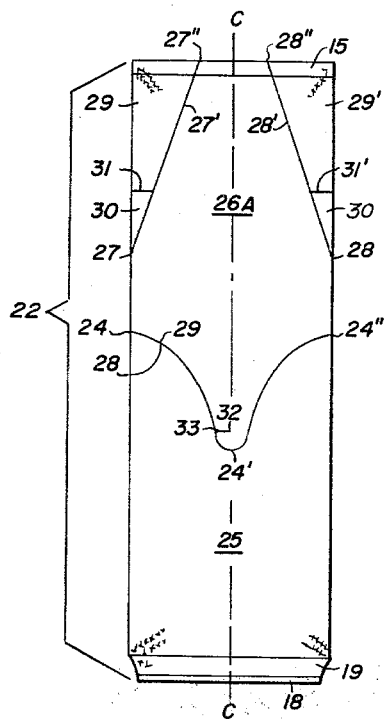
FIG. 6 is a diagrammatic view of cutting the shirt.

(1) As shown in FIG. 6, section 22 for the shirt is cut along the wave curve 24–24'–24", and the section on longitudinal center line C—C extending almost in the central part of the section 22 being low, and both-side sections being high. Then fabric 25 of the trunk or body portion is separated from section 26A of the arm sleeve.

(2) The fabric 26A for the arm sleeve is further symmetrically cut on lines 27–27', 27–27'' (27'' is the rear side) and 28–28', 28–28'' (28'' is the rear side) so that both sides of the fabric may be narrower in relation to the center line in the direction from both sides to the rim of the sleeve. As shown at A and B in FIG. 7, these cut fragments 29 and 29' are two triangular pieces, which may be discarded as waste.

(3) As shown in FIGS. 6 and 8, the portion left when the pieces 29 and 29' are cut, forms the arm sleeve. On one side section of the center line, the triangular cut section 24', 32 and 33 is made and this section is used for the front and rear neck pieces as shown in FIGS. 8 and 9. The fabric is further cut on both sides 24–27 and 24''–28 into the pieces for the same symmetrical arm sleeves 26 and 26' as shown at A and B in FIG. 8.

(4) The two arm sleeves 26 and 26' shown respectively at A and B in FIG. 8 are folded along center lines D—D, and D'—D'. By sewing together (34 and 34') the edges 24–27–27' and 24''–28–28', and also the edges 24''–28–28'' and 24–27–27'' respectively, both arm sleeves 26 and 26' can be obtained (refer to A and B in FIG. 9). The cuffs 60 and 60' of the two arm sleeves are of rib knitting.

(5) As shown in FIG. 10, the section for the trunk or body 25, from which the arm sleeve had been cut, is folded at its original center line 24' into front piece 35 and back piece 36. The central upper section of front piece 35 is cut away along a semi-circle 37–38–39 to make the portion for the front of the neck. The piece 40 thus removed as shown in FIG. 11 is sewed into the central upper part of the back piece 36. The lower edge of the trunk 25 is composed of rib-knitting 19 and interlock rib-knitting 18.

(6) As shown in FIG. 12, the arm sleeves 26 and 26' are sewed into the trunk 25. The edge 33–24 of the arm sleeve 26 is sewed into the upper edge 37–24' of the front piece 35, while the edge 33–24 of the arm sleeve 26' is sewed into another edge 39–24'. On the other hand, as shown in FIG. 13, the rear edge 24–24' of the arm sleeve 26 is sewed into the upper edge of one-half side of the rear piece 36, while the rear edge 24–24' of the arm sleeve 26' is sewed into the upper edge 24''–24' of another half side. Then elongated sections 58 and 58' of the arm sleeves 26 and 26' are positioned above the top end 24'' of the back piece, and sewed together to form the back of the neck, within which the cut piece 40 is overlapped and sewed.

As mentioned above, in tailoring the shirt, the central section of the fabric is cut into the symmetrical sections with the wave curve edges for the body and arm sleeve and the edge of the sleeve section can be united with only the neck edge of the body section. For example, as shown in FIG. 10, the neck edges of the fabric 25 of the body section are in the form of the wave curve 24–24'–24'' and are placed one upon another at their top and as the edges of both sides coincide with the rim of the arm sleeve (which had been cut along the same wave curve, FIGS. 12 and 13), the same can be sewn together without any cutting operation. Needless to say, the foregoing is very favorable for the tailoring work.

As illustrated in FIG. 13, the elongated sections 58 and 58' of the sleeves 26 and 26' are then connected with the upper section of the rear piece to define the shoulder section. Hence, as both sleeves are strained relative to each other, the tensile force effected by the movement of the arms is distributed so uniformly that the shirt can be worn with great comfort.

By virtue of the invention, there is very little waste material and the required tailoring can be easily achieved.

The invention is not to be confined to the precise details shown and described, and changes or modifications may be made therein so long as such changes or modifications mark no material departure from the spirit and scope of the appended claims.

What I claim is:

1. A method of producing a shirt, comprising the steps of knitting circularly a tube of fabric of the desired length, flattening the tube for providing two layers, severing both layers of the tube along a symmetrically wave-shaped line extending transversely of the tube at approximately the center thereof for providing a body section and a sleeve section, cutting both layers of the sleeve section along two diagonal lines to provide free edges therefor, severing the sleeve section along the fold lines for providing two sleeve members, securing each sleeve member along its free edges to form a sleeve, folding the body section along its longitudinal center line to provide the front and rear portions of the shirt, and attaching the sleeves to the arm holes provided by the symmetrically cut wave-shaped lines when the body section is thus folded.

2. A method of producing a shirt, comprising the steps of knitting circularly a tube of fabric of the desired length, flattening the tube for providing two layers, severing both layers of said tube along a symmetrically wave-shaped line extending transversely of the tube at approximately the center thereof for providing a body section and a sleeve section, cutting both layers of the sleeve section along two diagonal lines to provide free edges therefor, severing the sleeve section along the fold lines for providing two sleeve members, sewing each sleeve member along its free edges to form a sleeve, folding said body section along its longitudinal center line to provide the front and rear portions of the shirt and sewing the sleeves to the arm holes formed by the symmetrically cut wave-shaped lines when the body portion is thus folded.

References Cited by the Examiner

UNITED STATES PATENTS

| | | | |
|---|---|---|---|
| 765,941 | 7/04 | Sibbald | 66—172 |
| 1,211,766 | 1/17 | Schremp | 2—243 |
| 2,000,073 | 5/35 | Goas | 66—176 |
| 2,045,938 | 6/36 | Bentley et al. | 66—1 |
| 2,104,288 | 1/38 | Blood | 2—115 X |
| 2,195,183 | 3/40 | McAdams | 66—1 |
| 2,575,700 | 11/51 | Artzt | 66—176 |

JORDAN FRANKLIN, *Primary Examiner.*

RUSSELL C. MADER, DAVID J. WILLIAMOWSKY,
*Examiners.*